US011490461B2

(12) United States Patent
Balasubramanian

(10) Patent No.: US 11,490,461 B2
(45) Date of Patent: Nov. 1, 2022

(54) INTEGRATED WATER DETECTION AND EJECTION FOR CERAMIC SUBSTRATES

(71) Applicant: Apple Inc., Cupertino, CA (US)

(72) Inventor: Ashwin Balasubramanian, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 314 days.

(21) Appl. No.: 16/942,655

(22) Filed: Jul. 29, 2020

(65) Prior Publication Data
US 2022/0039211 A1 Feb. 3, 2022

(51) Int. Cl.
G01N 27/22 (2006.01)
H05B 3/28 (2006.01)

(52) U.S. Cl.
CPC .......... *H05B 3/283* (2013.01); *G01N 27/223* (2013.01); *G01N 27/226* (2013.01)

(58) Field of Classification Search
CPC ..... H05B 3/283; G01N 27/223; G01N 27/226
See application file for complete search history.

(56) References Cited

U.S. PATENT DOCUMENTS

| 9,176,089 | B2* | 11/2015 | Le Neel | H01L 27/0248 |
| 2015/0291415 | A1* | 10/2015 | Haney | B81B 7/0041 |
| | | | | 438/22 |
| 2016/0116427 | A1* | 4/2016 | Laurenson | B05D 5/00 |
| | | | | 427/2.13 |
| 2019/0100428 | A1* | 4/2019 | Vummidi Murali | |
| | | | | B81C 1/0023 |
| 2019/0149899 | A1* | 5/2019 | Leonhardt | H04R 7/04 |
| | | | | 381/386 |

* cited by examiner

*Primary Examiner* — Alvaro E Fortich
(74) *Attorney, Agent, or Firm* — Bakerhostetler

(57) ABSTRACT

A water detecting and ejecting sensor device includes a housing, a ceramic substrate, an integrated circuit and a sensor. The housing includes a cavity and the integrated circuit is disposed on a ceramic substrate. The sensor is disposed on the integrated circuit. The ceramic substrate includes one or more ports to expose the cavity to a surrounding environment, and each port includes at least two mesh layers.

20 Claims, 4 Drawing Sheets

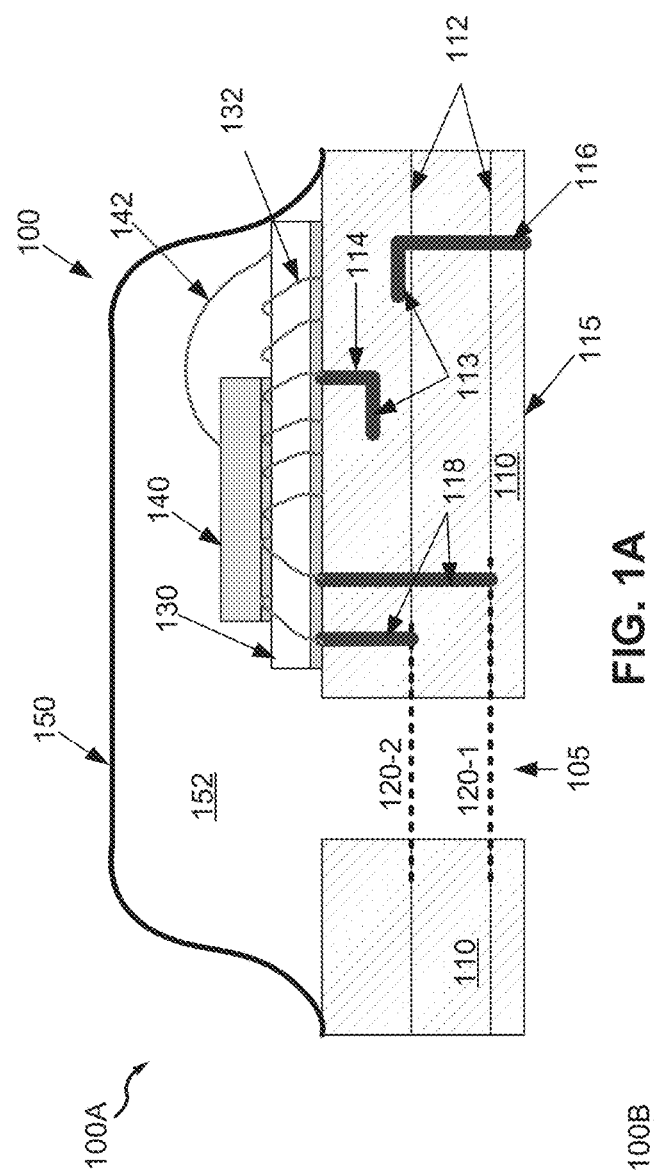
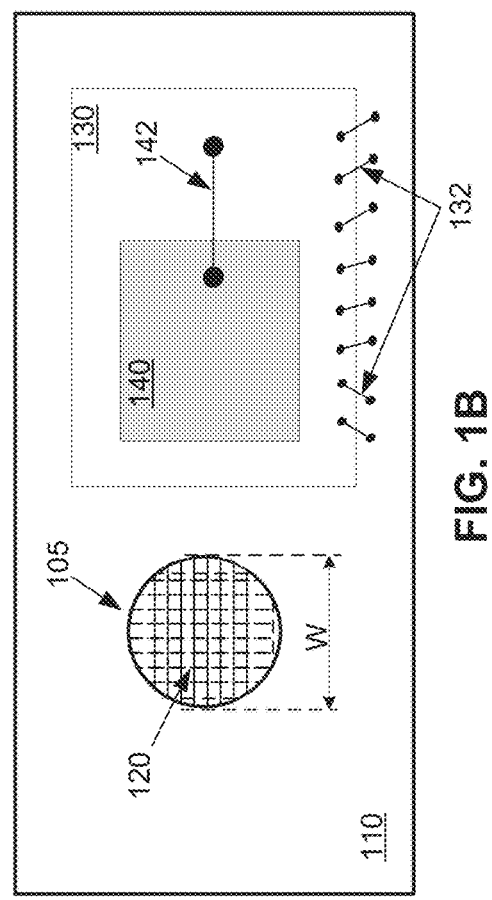
FIG. 1A
FIG. 1B

INTEGRATED WATER DETECTION AND EJECTION FOR CERAMIC SUBSTRATES

TECHNICAL FIELD

The present description relates generally to sensor technology, and more particularly, to an integrated water detection and ejection mechanism for sensor devices with ceramic substrates.

BACKGROUND

Portable communication devices (e.g., smartphones and smartwatches) are becoming increasingly equipped with environmental sensors, such as pressure sensors, temperature and humidity sensors, gas sensors and particulate matter (PM) sensors. For example, a pressure sensor can enable health and fitness features in a smartwatch or a smartphone. A measured pressure can then be converted (e.g., by a processor) to other parameters related to pressure, for example, elevation, motion, flow or other parameters. Pressure sensors can be used to measure pressure in a gas or liquid environment.

Pressure sensors can vary drastically in technology, design, performance and application. In terms of employed technologies, pressure sensors can be categorized as, for example, piezoelectric, capacitive, electromagnetic, optical or potentiometric pressure sensors. The microelectromechanical system (MEMS) type pressure sensors used in smartphones or smartwatches are generally capacitive-type pressure sensors. Wearable devices (e.g., smartwatches) are required to survive increasingly more stringent reliability requirements, as they can be exposed to water and environmental contaminants such as dust, sand and other debris. Gel-filled sensors have been used to survive exposure to water and environmental contaminants. Pressure sensors using interim gel have been widely used in the microelectronic devices, but the gel-filled pressure sensors are vulnerable to pressure errors.

BRIEF DESCRIPTION OF THE DRAWINGS

Certain features of the subject technology are set forth in the appended claims. However, for purposes of explanation, several embodiments of the subject technology are set forth in the following figures.

FIGS. 1A and 1B are schematic diagrams illustrating a cross-sectional view and a top view of an example integrated water-resistant sensor device, in accordance with one or more aspects of the subject technology.

DETAILED DESCRIPTION

Figure 2:
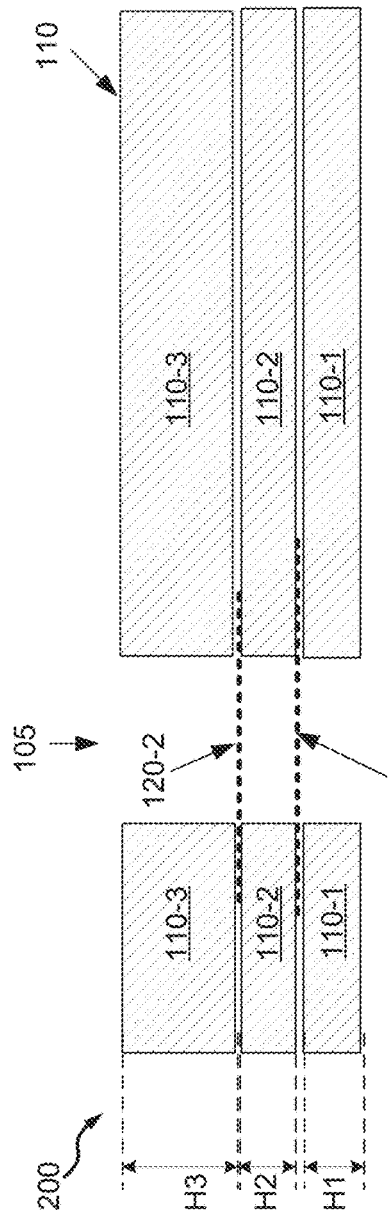
FIG. 2 is a diagram illustrating a cross-sectional view of the structure of a ceramic substrate of an example integrated water-resistant sensor device, in accordance with one or more aspects of the subject technology.

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

The subject technology is directed to an integrated water detection and ejection mechanism for sensor devices with ceramic substrates. The integrated sensor device of the subject technology is water resistant, as it has provisions for detecting the presence of water and ejecting the water by causing it to evaporate. Gel-filled sensors have been used in wearable devices (e.g., smartwatches) to survive exposure to water and environmental contaminants, such as dust, sand and other debris. Pressure sensors using interim gel have been widely used in the microelectronic devices, but the gel-filled pressure sensors are vulnerable to pressure errors due to a number of issues. For example, the gel-filled sensors suffer from orientation sensitivity and are susceptible to change of gel-package boundary conditions due to chemical and/or mechanical accumulation. Furthermore, in a gel-filled sensor, capillary pressure errors can occur due to presence of water in the gel surface.

Existing solutions for gel elimination use organic materials such as expanded-polytetrafluoroethylene (ePTFE) membrane or mesh to provide environmental robustness. However, ePTFE is incompatible with ceramic substrate lamination temperatures. For instance, when wet, ePTFE does not allow water detection via orientation sensitivity (as a gel-filled sensor would) as it cannot provide a water-detection signal. Ceramic is desirable as a substrate material as it affords much greater strain resistance as compared with traditional organic substrates. In particular, strain resistance is desirable for pressure sensors to reduce errors due to mechanical loading on the device that can be transferred to the sensor via the substrate. On the other hand, organic substrates are compatible with organic substrate lamination temperatures.

The subject technology utilizes one or more tightly woven metal mesh layer (e.g., stainless steel, and hereinafter, mesh layer) and laminates the mesh layers between a number of ceramic layers, which forms a parallel plate capacitor. The mesh layer affords significant environmental ingress protection while eliminating the orientation sensitivity error associated with gel-filled sensors. When the sensor is completely dry, air forms the dielectric medium between mesh-layer parallel plates and produces a first capacitance value (C-dry). When the sensor is wet, water trapped between the two mesh-layer parallel plates changes the dielectric constant and hence the capacitance value to a second capacitance value (C-wet).

An integrated circuit (IC) or a microcontroller ($\mu$C) can be used to distinguish between wet and dry conditions for the sensor. When the IC or $\mu$C determines that the sensor is wet, it can apply a direct current (DC) voltage across the mesh-layer parallel plates with trapped water (effectively a resistor). Current can flow through the water and cause the mesh-layer parallel plates to heat up and evaporate the accumulated water (water ejection). As the water evaporates, the resistance will start to increase, reducing the current flow. Once zero current flow is detected, the water is fully ejected and can be verified by switching back to the detection circuit.

FIGS. 1A and 1B are schematic diagrams illustrating cross-sectional view 100A and a top view 100B of an example integrated water-resistant sensor device 100, in accordance with one or more aspects of the subject technology. The integrated water-resistant sensor device 100 (hereinafter, device 100) has provisions for detecting and ejecting water accumulation, as discussed herein. The device 100, as shown in the cross-sectional view 100A, includes a ceramic substrate 110, an IC 130 a sensor 140 and a housing 150. The sensor 140 can be an environmental sensor such as a gas sensor or a pressure sensor that can measure a gas content of the cavity 152 or the pressure inside the cavity 152, which is equalized with the environmental pressure via the port 105. In one or more implementations, the device 100 can include more than one port, for example, an array of ports. The port 105 is a hole in the ceramic substrate 110, which is a ceramic substrate.

The ceramic substrate 110 is formed of three sub-layers with boundaries 112, which incorporate mesh layers 120 (e.g., 120-1 and 120-2). The mesh layers 120 are tightly woven metal mesh layers and protect the cavity 152 against environmental contaminants such as particulates and water accumulation. In some aspects, the mesh layers 120 can be made of stainless steel or other suitable metals such as tungsten, titanium or other noncorrosive metals that are compatible with ceramic fabrication processes. The mesh layers 120 are electrically connected to the IC 130 using vias 118 and are instrumental in water detection and ejection, as discussed herein. The ceramic substrate 110 includes a number of conductive traces 113, which are conductive routing traces and are also connected to the IC 130 through vias 114, of which only one is shown for simplicity. The connection to conductive traces 113 can also be achieved from a surface 115 of the ceramic substrate 110 through vias 116, of which only one is shown for simplicity.

The IC 130 can be attached to the ceramic substrate 110 and the sensor 140 is disposed on the IC 130 via a suitable adhesive. The wire bonds 132 provide signal and direct current (DC) connection between the terminals of the IC 130 and the conductive traces 113 and the mesh layers 120, respectively, through vias 114 and 118. The signal and DC connection between the sensor 140 and IC 130 is provided through one or more wire bonds 142.

In some implementations, the IC 130 is an application-specific integrated circuit (ASIC) and includes one or more μC, which can control water detection and ejection operation of the mesh layers 120. The mesh layers 120-1 and 120-2 form electrodes of a variable capacitance that changes from C-dry to C-wet, when the water is present in the space between the electrodes (mesh layers 120-1 and 120-2). In the absence of water, this space is filled with air with a capacitance C-dry that is totally different from C-wet. The IC 130 can detect the capacitance value transition from C-dry to C-wet as an indication of the presence of water in the space between the mesh layers 120-1 and 120-2 by applying a suitable alternating current (AC) to the mesh layers 120-1 and 120-2.

Once the presence of water is detected, the IC 130 directs a DC electric current through the vias 118 to the mesh layers 120-1 and 120-2, which along with the water in between them form a resistive path. The passage of the DC electric current through the mesh layers 120-1 and 120-2 can generate heat that results in evaporation of the water. Thus, the mesh layers 120-1 and 120-2 along with the IC 130 are responsible for the water detection and ejection feature of the device 100 and make the device 100 a water-resistant sensor device that can meet the stringent reliability requirements of the wearable devices such as smartwatches.

The top view 100B of the device 100 shows the port 105, the mesh layers 120, the IC 130, the sensor 140, the wire bonds 142 between the IC 130 and the sensor 140 and the wire bonds 132 between the IC 130 and vias of the ceramic substrate 110. As alluded to above, the port 105 may be a representative of multiple ports (holes) in the ceramic substrate 110. In some aspects, a width W of the port 105 may be within a range of between a few tens and a few hundreds of μm. An example thickness value of the mesh layer 120 is within a range of about 15-30 μm.

FIG. 2 is a diagram illustrating a cross-sectional view 200 of the structure of the ceramic substrate 110 of the example integrated water-resistant sensor device, in accordance with one or more aspects of the subject technology. The ceramic substrate 110 is made of a number of layers, for example, three layers 110-1, 110-2 and 110-3, which are suitably bonded together. The multilayer structure of the ceramic substrate 110 allows laminating two or more mesh layers (e.g., tightly woven metal mesh layers) in between the layers. In the example ceramic substrate 110 of FIG. 2, the mesh layers 120-1 and 120-2 are laminated between layers 110-1 and 110-2 and between layers 110-2 and 110-3, respectively, in the area of the port 105. In some aspects, the conductive traces 113 can be realized in the top layer 110-3. Example values for the heights H1, H2 and H3 of the layers 110-1, 110-2 and 110-3 of the ceramic substrate 110 are 50, 50 and 100 μm, although other values can be used as needed.

Figure 3:
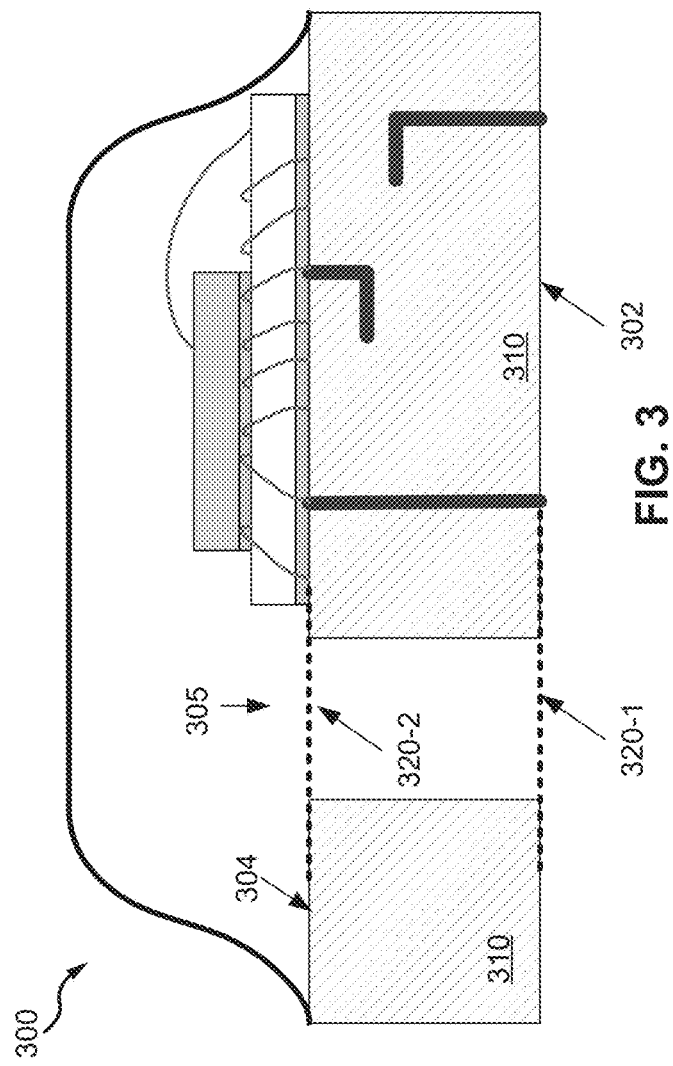
FIG. 3 is a diagram illustrating a cross-sectional view of an example integrated water-resistant sensor device, in accordance with one or more aspects of the subject technology.

FIG. 3 is a diagram illustrating a cross-sectional view of an example integrated water-resistant sensor device 300, in accordance with one or more aspects of the subject technology. The integrated water-resistant sensor device 300 (hereinafter, device 300) is similar to the device 100 of FIG. 1, except for the ceramic substrate 310 that is monolithic and the position of the mesh layers 320 (320-1 and 320-2) in the port 305. In the device 300, the mesh layers 320-1 and 320-2 are suitably attached to the first surface 302 and the second surface 304 of the ceramic substrate 310, respectively. In this embodiment, the mesh layers 320 can be tightly woven metallic mesh layers or can initially be solid metal layers that are subsequently laser drilled after the lamination and co-firing to form a mesh-like structure. The advantage of the device 300 is the ease of fabrication, as the hole for the port 305 can be made after fabrication of the ceramic substrate 310. The mesh layers 320 can then be attached to the first and second surfaces 302 and 304 of the ceramic substrate 310 in the area of the port 305.

Figure 4:
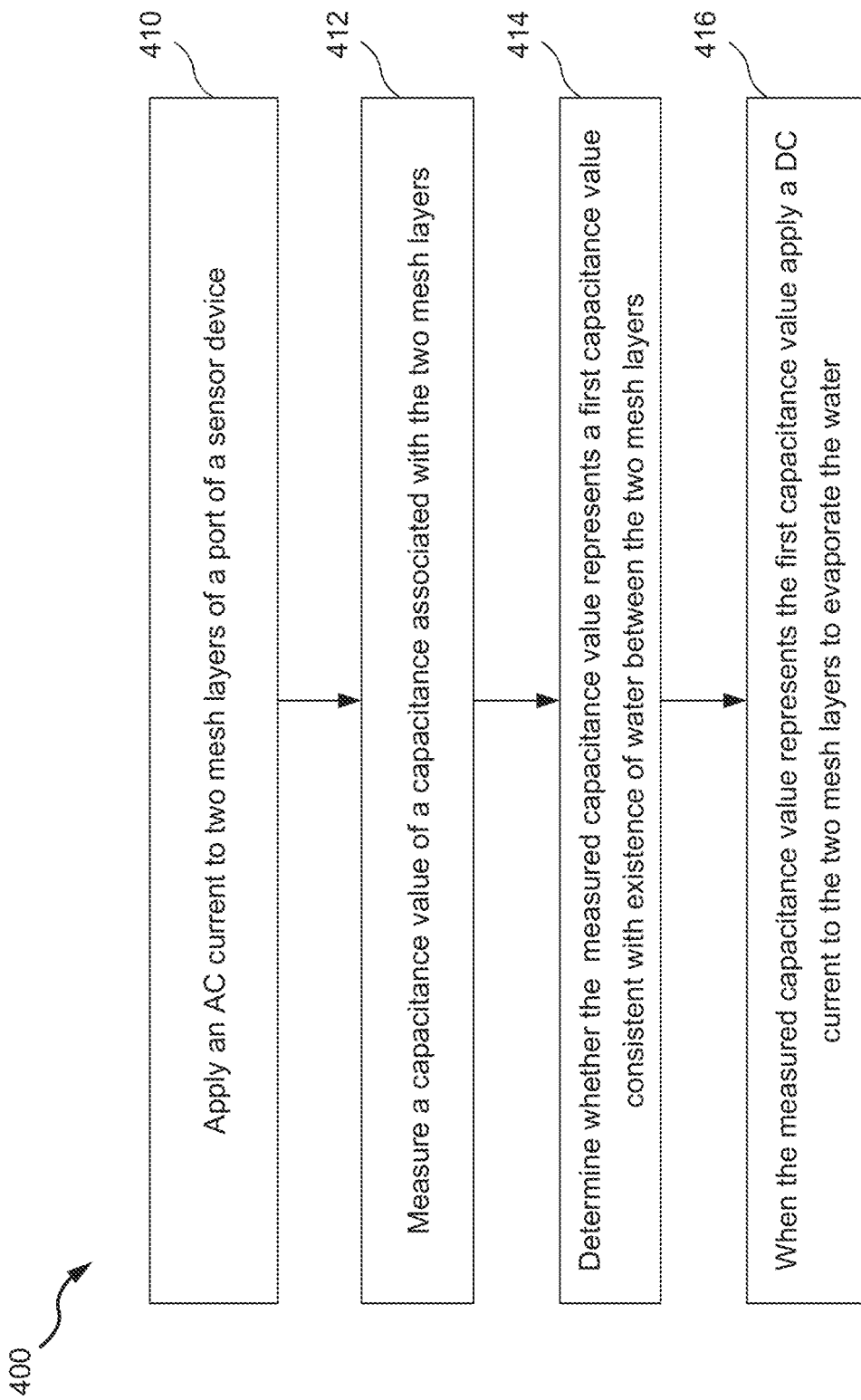
FIG. 4 is a flow diagram illustrating a functional process of an example integrated. water-resistant sensor device, in accordance with one or more aspects of the subject technology.

FIG. 4 is a flow diagram illustrating a functional process 400 of an example integrated water-resistant sensor device, in accordance with one or more aspects of the subject technology. For explanatory purposes, the functional process 400 is primarily described herein with reference to the device 100 of FIG. 1A. However, the functional process 400 is not limited to the device 100 of FIG. 1A, and one or more blocks (or operations) of the functional process 400 may be performed by one or more other components of other suitable devices, such as the device 300 of FIG. 3. Further, for explanatory purposes, the blocks of the functional process 400 are described herein as occurring in serial, or linearly. However, multiple blocks of the functional process 400 may occur in parallel. In addition, the blocks of the functional process 400 need not be performed in the order shown and/or one or more blocks of the functional process 400 need not be performed and/or can be replaced by other operations.

The functional process 400 includes applying, by an integrated circuit (e.g., 130 of FIG. 1A or 1B), an AC current to two mesh layers (e.g., 120 of FIG. 1A or 1B) of the device 100 (410). The integrated circuit then measures a capacitance value of the capacitance associated with the two mesh layers (412). Next, the integrated circuit determines whether the measured capacitance value matches a first capacitance value associated with presence of water between the two mesh layers (414). If the measured capacitance value matches the first capacitance value the integrated circuit applies a DC current to the two mesh layers to evaporate the water through resistive heating (416). In some implementations, when the presence of water is detected, the host device (e.g., smartphone or smartwatch) can disregard the pressure sensor and instead rely on other modes of detecting motion such as using an accelerometer or a gyro of the host device to avoid false flights and/or exercise minutes resulting from capillary pressure errors as the water dries.

Figure 5:
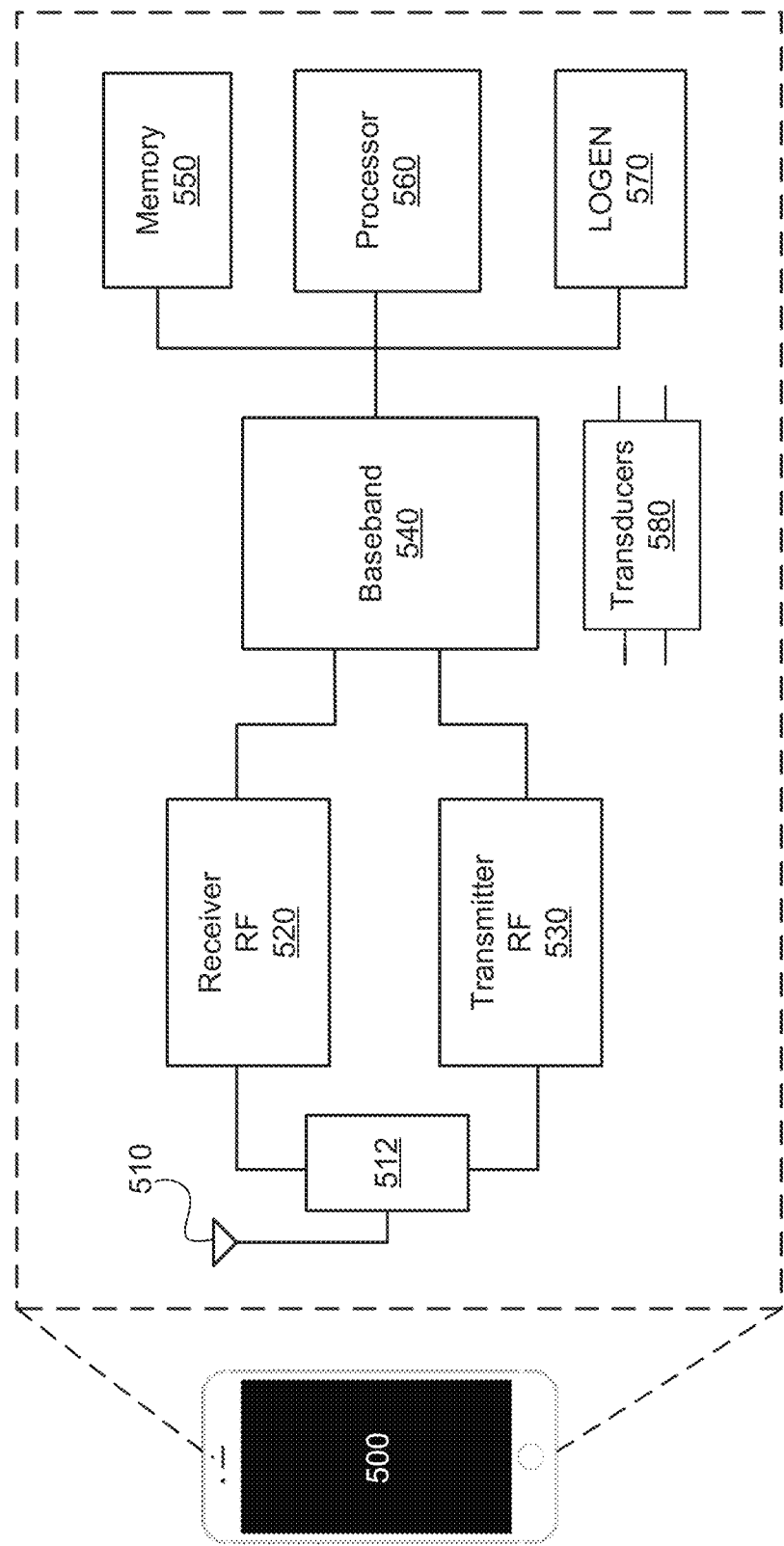
FIG. 5 is a block diagram illustrating an example wireless communication device, within which one or more integrated water-resistant sensor device of the subject technology can be integrated.

FIG. 5 is a block diagram illustrating an example wireless communication device, within which one or more integrated water-resistant sensor devices of the subject technology can be integrated. In one or more implementations, the wireless communication device 500 can be a smartphone or a smartwatch. The wireless communication device 500 may comprise a radio-frequency (RF) antenna 510, a receiver 520, a transmitter 530, a baseband processing module 540, a memory 550, a processor 560, a local oscillator generator (LOGEN) 570 and one or more transducers 580. In various embodiments of the subject technology, one or more of the blocks represented in FIG. 5 may be integrated on one or more semiconductor substrates. For example, the blocks 520-570 may be realized in a single chip or a single system on a chip, or may be realized in a multichip chipset.

The receiver 520 may comprise suitable logic circuitry and/or code that may be operable to receive and process signals from the RF antenna 510. The receiver 520 may, for example, be operable to amplify and/or down-convert received wireless signals. In various embodiments of the subject technology, the receiver 520 may be operable to cancel noise in received signals and may be linear over a wide range of frequencies. In this manner, the receiver 520 may be suitable for receiving signals in accordance with a variety of wireless standards, Wi-Fi, WiMAX, Bluetooth, and various cellular standards. In various embodiments of the subject technology, the receiver 520 may not require any SAW filters and few or no off-chip discrete components such as large capacitors and inductors.

The transmitter 530 may comprise suitable logic circuitry and/or code that may be operable to process and transmit signals from the RF antenna 510. The transmitter 530 may, for example, be operable to up-convert baseband signals to RF signals and amplify RF signals. In various embodiments of the subject technology, the transmitter 530 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 530 may be operable to provide signals for further amplification by one or more power amplifiers.

The duplexer 512 may provide isolation in the transmit band to avoid saturation of the receiver 520 or damaging parts of the receiver 520, and to relax one or more design requirements of the receiver 520. Furthermore, the duplexer 512 may attenuate the noise in the receive band. The duplexer may be operable in multiple frequency bands of various wireless standards.

The baseband processing module 540 may comprise suitable logic, circuitry, interfaces, and/or code that may be operable to perform processing of baseband signals. The baseband processing module 540 may, for example, analyze received signals and generate control and/or feedback signals for configuring various components of the wireless communication device 500, such as the receiver 520. The baseband processing module 540 may be operable to encode, decode, transcode, modulate, demodulate, encrypt, decrypt, scramble, descramble, and/or otherwise process data in accordance with one or more wireless standards.

The processor 560 may comprise suitable logic, circuitry, and/or code that may enable processing data and/or controlling operations of the wireless communication device 500. In this regard, the processor 560 may be enabled to provide control signals to various other portions of the wireless communication device 500. The processor 560 may also control transfers of data between various portions of the wireless communication device 500. Additionally, the processor 560 may enable implementation of an operating system or otherwise execute code to manage operations of the wireless communication device 500.

The memory 550 may comprise suitable logic, circuitry, and/or code that may enable storage of various types of information such as received data, generated data, code, and/or configuration information. The memory 550 may comprise, for example, RAM, ROM, flash, and/or magnetic storage. In various embodiments of the subject technology, information stored in the memory 550 may be utilized for configuring the receiver 520 and/or the baseband processing module 540.

The local oscillator generator (LOGEN) 570 may comprise suitable logic, circuitry, interfaces, and/or code that may be operable to generate one or more oscillating signals of one or more frequencies. The LOGEN 570 may be operable to generate digital and/or analog signals. In this manner, the LOGEN 570 may be operable to generate one or more clock signals and/or sinusoidal signals. Characteristics of the oscillating signals, such as the frequency and duty cycle, may be determined based on one or more control signals from, for example, the processor 560 and/or the baseband processing module 540.

In operation, the processor 560 may configure the various components of the wireless communication device 500 based on a wireless standard according to which it is desired to receive signals. Wireless signals may be received via the RF antenna 510, amplified, and down-converted by the receiver 520. The baseband processing module 540 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 550, and/or information affecting and/or enabling operation of the wireless communication device 500. The baseband processing module 540 may modulate, encode, and perform other processing on audio, video, and/or control signals to be transmitted by the transmitter 530 in accordance with various wireless standards.

The one or more transducers 580 may include the miniature water detecting and ejecting device of the subject technology, for example, as shown in FIG. 1A, FIG. 1B and/or FIG. 3 and described above. The miniature water detecting and ejecting device of the subject technology can be readily integrated into the communication device 500, in particular, when the communication device 500 is a smartphone or a smartwatch. In one or more implementations, the processor 560 can process sensor signals from the integrated sensor device of the subject technology, after being converted to digital signals by an ADC (e.g., an ADC of the communication device 500), to convert a measured sensor value (e.g., pressure) to a value of a corresponding parameter such as elevation, motion or other parameters. The processor 560 can further process signals from the IC (e.g., 130 of FIG. 1A), for example, a signal indicating detection of water in the port (e.g., 105 of FIG. 1A) of the sensor device and to cause the IC to apply a DC current to the mesh layers (e.g., 120 of FIG. 1A) to heat the mesh layers via resistive heating. In one or more implementations, the memory 550 can store measured pressure values, converted values, e.g., of the corresponding parameters such as elevation or motion or other parameters, and/or look-up tables for such conversions.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neutral gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later conic to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A water detecting and ejecting sensor device, the device comprising:
    a housing including a cavity;
    an integrated circuit disposed on a ceramic substrate; and
    a sensor disposed on the integrated circuit,
    wherein:
        the ceramic substrate includes one or more ports configured to expose the cavity to a surrounding environment, and
        each port of the one or more ports includes at least two mesh layers.

2. The device of claim 1, wherein the at least two mesh layers comprise metallic mesh layers and are configured to form electrodes of a capacitance.

3. The device of claim 1, wherein the integrated circuit comprises an application-specific integrated circuit (ASIC) including one or more microcontrollers (μCs), and wherein the sensor is wire bonded to the ASIC.

4. The device of claim 3, wherein the at least two mesh layers are conductively coupled to the ASIC through a pair of vias.

5. The device of claim 4, wherein the ASIC is configured to drive an alternating current (AC) current into the at least two mesh layers to measure a capacitance value associated with the at least two mesh layers.

6. The device of claim 4, wherein the ASIC is configured to measure a first capacitance value when the at least two mesh layers are dry.

7. The device of claim 4, wherein the ASIC is configured to measure a second capacitance value when water exist between the at least two mesh layers, wherein the ASIC is configured to utilize the second capacitance value to record a water detection event.

8. The device of claim 7, wherein the ASIC is configured to apply a direct current (DC) voltage to the at least two mesh layers to generate heat by resistive heating to evaporate the water.

9. The device of claim 1, wherein the ceramic substrate includes multiple layers and the at least two mesh layers are laminated between two of the multiple layers.

10. The device of claim 1, wherein the sensor comprises an environmental sensor, including a pressure sensor or a gas sensor.

11. The device of claim 1, wherein the at least two mesh layers comprise tightly woven metallic mesh layers made of a metal, including stainless steel, tungsten, titanium or other noncorrosive metals compatible with ceramic fabrication processes.

12. A communication device comprising:
    a processor; and
    a device comprising:
        a housing including a cavity;
        a ceramic substrate attached to the housing; and a sensor disposed within the cavity and coupled to an integrated circuit, wherein:

the ceramic substrate includes one or more ports exposing the cavity to a surrounding environment, and each port of the one or more ports include at least two metallic mesh layers attached to the ceramic substrate and conductively coupled to the integrated circuit.

13. The communication device of claim 12, wherein the integrated circuit comprises an ASIC and is coupled to the processor, and wherein the sensor is wire bonded to the ASIC.

14. The communication device of claim 13, wherein the at least two metallic mesh layers are attached to end surfaces of the ceramic substrate and are conductively coupled to the ASIC and form two electrodes of a capacitance.

15. The communication device of claim 14, wherein the ASIC is configured to drive an AC current into the two electrodes of the capacitance to measure a capacitance value.

16. The communication device of claim 15, wherein the ASIC is configured to measure a first capacitance value when the two electrodes are dry and a second capacitance value when water exist between the two electrodes.

17. The communication device of claim 16, wherein the ASIC is configured to:

utilize the second capacitance value to record a water-detection event, and report the water-detection event to the processor.

18. The communication device of claim 17, wherein in response to the water-detection event, the processor is configured to cause the ASIC to apply a DC voltage to the two electrodes to generate heat by resistive heating to evaporate the water.

19. An apparatus comprising:

a housing coupled to a ceramic substrate including one or more ports;

an integrated circuit disposed on the ceramic substrate; and a sensor disposed on the integrated circuit, wherein:

the ceramic substrate comprises a multilayer substrate, at least one layer of the multilayer substrate includes conductive traces coupled to the integrated circuit through conductive vias, and the one or more ports include two metallic mesh layers laminated between two layers of the multilayer substrate.

20. The apparatus of claim 19, wherein:

the two metallic mesh layers are configured to form electrodes of a capacitance, the integrated circuit is configured to:

measure the capacitance, register a water-detection event when a first capacitance value associated with presence of water between the electrodes is measured, and in response to the water-detection event, apply a DC voltage to the electrodes to evaporate the water.

* * * * *